United States Patent [19]

Amann et al.

[11] 4,412,067
[45] Oct. 25, 1983

[54] PROCESS FOR THE CONTINUOUS POLYMERIZATION OR COPOLYMERIZATION OF TRIOXANE

[75] Inventors: Herbert Amann; Gerhard Morlock, both of Hanau, Fed. Rep. of Germany

[73] Assignee: Degussa Aktiengesellschaft, Frankfurt am Main, Fed. Rep. of Germany

[21] Appl. No.: 448,472

[22] Filed: Dec. 10, 1982

[30] Foreign Application Priority Data

Dec. 12, 1981 [DE] Fed. Rep. of Germany ....... 3149321

[51] Int. Cl.³ .............................................. C08G 2/10
[52] U.S. Cl. .................................. 528/232; 528/270
[58] Field of Search ............... 528/232, 270, 480, 502, 528/503

[56] References Cited

U.S. PATENT DOCUMENTS

| | | | |
|---|---|---|---|
| 3,299,003 | 1/1967 | Bäder et al. | 260/67 |
| 3,423,363 | 1/1969 | Fournel | 528/270 |
| 3,845,160 | 10/1974 | Bäder et al. | 260/823 |
| 4,045,415 | 8/1977 | Sextro et al. | 528/232 |
| 4,343,929 | 8/1982 | Sugio et al. | 528/232 X |
| 4,366,305 | 12/1982 | Amemiya et al. | 528/270 X |

FOREIGN PATENT DOCUMENTS

| | | |
|---|---|---|
| 1137215 | 9/1962 | Fed. Rep. of Germany . |
| 1225389 | 9/1966 | Fed. Rep. of Germany . |
| 1244408 | 7/1967 | Fed. Rep. of Germany . |
| 1454774 | 1/1971 | Fed. Rep. of Germany . |
| 2003270 | 8/1971 | Fed. Rep. of Germany . |
| 1495228 | 1/1972 | Fed. Rep. of Germany . |
| 1720358 | 4/1972 | Fed. Rep. of Germany . |
| 1720300 | 6/1974 | Fed. Rep. of Germany . |
| 2362172 | 6/1975 | Fed. Rep. of Germany . |
| 2362791 | 6/1975 | Fed. Rep. of Germany . |
| 2543790 | 4/1976 | Fed. Rep. of Germany . |
| 2753218 | 6/1978 | Fed. Rep. of Germany . |
| 3018898 | 11/1980 | Fed. Rep. of Germany . |
| 3040049 | 9/1981 | Fed. Rep. of Germany . |

OTHER PUBLICATIONS

Kraft, "Feststoffmescher", Verfahrstechnik 3 (1969), pp. 344-352.
"Kunststoff-Handbuch", vol. XI, pp. 13-18 & 21-23, Carl Hanswer Verlag, Munich (1971).

Primary Examiner—Lucille M. Phynes
Attorney, Agent, or Firm—Cushman, Darby & Cushman

[57] ABSTRACT

Trioxane homo-or copolymerizate is produced by continuously feeding the liquid starting material to be polymerized into a mixer in which there is present a powdered to granular oxymethylene homopolymer or copolymer which is fluidized to form a fluidized bed, the speed of feeding, catalyst concentration and polymerization temperature are coordinated to each other in suitable manner and after a polymerization reaction of at least 70 percent polymerizate is continuously or cyclically discharged from the mixer serving as reactor.

12 Claims, 5 Drawing Figures

PROCESS FOR THE CONTINUOUS POLYMERIZATION OR COPOLYMERIZATION OF TRIOXANE

BACKGROUND OF THE INVENTION

The invention is directed to a process for the continuous polymerization of trioxane alone or together with trioxane copolymerizable compounds in the presence of a cationically active catalyst.

There are already known a large number of processes of this type which can be divided into four groups.

1. A molten starting material is polymerized in the quiescent state, that is, without the influence of stirrers or kneaders. Such processes are described, for example, in German Pat. No. 1,137,215, German AS No. 1225389, Germ AS No. 1244408 (and related Bä der in U.S. Pat. No. 3,299,003, the entire disclosure of which is hereby incorporated by reference and relied upon), German AS No. 1720300, and in German Pat. No. 2003270 (or related Bä der in U.S. Pat. No. 3,845, 160, the entire disclosure of which is hereby incorporated by reference and relied upon). In this process, the polymerizate is obtained in a form which makes necessary a subsequent comminution, e.g., in thin plates or in thick blocks.

2. A molten starting material is polymerized in self-cleaning machines provided with mixing organs whereby it is divided under gradual solidification, first being transferred into a pasty state and subsequently through the mixing organ being converted to a dry, granular polymerizate. Such processes are described, for example, in German AS No. 1161421, German AS No. 1454774, German AS No. 1495228, German AS No. 1720358, German OS No. 2543790, German OS No. 2753218, German OS No. 3018898, and German OS No. 3040049. They require the employment of very special and expensive machines.

3. A molten starting material is homogeneously mixed with the catalyst, solidified through quick cooling and polymerized in the solid condition. Such processes are described, for example, in German OS No. 2362172 and German OS No. 2362791. Likewise, they require the employment of relatively expensive machines.

4. The starting material is polymerized in or out of the vapor phase. Such a process is described in German Pat. No. 1137215. In this process, however, a large part of starting material employed passes through the reactor unchanged.

The entire disclosures of all of the above-mentioned German patents and applications are hereby incorporated by reference and relied upon.

SUMMARY OF THE INVENTION

The process of the invention is characterized by continuously feeding the liquid starting material to be polymerized into a mixer serving as a reactor in which powdered to granular oxymethylene homopolymer or copolymer is fluidized to a stable fluidized bed with a rotor speed above the critical speed of rotation, the rate of feeding the starting material to be polymerized is adjusted so that per minute 0.5 to 10 weight percent, based on the total reactor contents, is supplied, the catalyst concentration chosen so that a solidification of the liquid starting material occurs within 20 to 50 seconds after the addition of the catalyst, the temperature of the reactor contents held in the range between 60° and 125° C. and after a polymerization reaction of at least 70 percent polymerizate is continuously or cyclically discharged from the reactor.

As starting material for the process of the invention, there serves either molten trioxane alone or a molten mixture of trioxane and at least one compound copolymerizable with trioxane. Examples of such compounds are cyclic ethers having 3 to 5, preferably 3 ring members, cyclic acetals differing from trioxane, especially formals having 5 to 11, preferably 5 to 8, ring members; or linear polyacetals, especially polyformals. These compounds are employed at times in an amount between 0.01 and 20, preferably between 0.1 and 10, especially between 1 and 5 weight percent, based on the weight of the trioxane.

Particularly suitable as compound copolymerizable with trioxane are compounds of the formula:

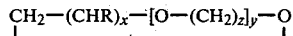

$$CH_2-(CHR)_x-[O-(CH_2)_z]_y-O$$

in which R signifies a hydrogen atom, an alkyl radical having 1 to 6, preferably 1, 2, or 3 carbon atoms, which can be substituted by 1, 2, or 3 halogen atoms, preferably chlorine atoms; an alkoxymethyl radical having 2 to 6, preferably 2, 3, or 4 carbon atoms; a phenyl radical or a phenoxymethyl radical; x is a whole number from 1 to 3, when y=0; y is a whole number from 1 to 3, when x=0 and z=2; z is a whole number from 3 to 6, preferably 3 or 4, when x=0 and y=1.

Epoxides, for example, ethylene oxide, styrene oxide, propylene oxide, and epichlorohydrin, as well as glycidyl ethers of mono- or multivalent alcohols or phenols are suitable above all as cyclic ethers. Examples of the glycidyl ethers include glydidyl butyl ether, glycidyl phenyl ether, diglycidyl ether of ethylene glycol, diglycidyl ether of diethyleneglycol, diglycidyl ether of resorcinol, diglycidyl ether of bisphenol A.

Suitable above all as cyclic acetals are cyclic formals of aliphatic or cycloaliphatic α,ω-diols having 2 to 8, preferably 2, 3, or 4 carbon atoms, the carbon chain of which can be interrupted at intervals of 2 carbon atoms by an oxygen atom, for example, glycol formal (1,3-dioxolane), propanediol formal (1,3-dioxane), butanediol formal (1,3-dioxepane), and diglycol formal (1,3,6-trioxocane), as well as 4-chloromethyl-1,3-dioxolane, hexanediol formal (1,3-dioxonane), and butenediol formal [1,3-dioxacycloheptane-(5)]. However, diformals, for example diglycerin diformal, are also suitable, especially for the production of terpolymers of trioxane.

As linear polyacetals, there are suited both homo- and copolymerizates of the precedingly defined cyclic acetals and also linear condensates of aliphatic or cycloaliphatic α,ω-diols, with aliphatic aldehydes or thioaldehydes, preferably formaldehyde, are suitable as linear polyacetals. Especially preferred are the homopolymers of cyclic formals of aliphatic α,ω-diols having 2 to 8, preferably 2, 3, or 4 carbon atoms, such as poly-(1,3-dioxolane), poly(1,3-dioxane), and poly(1,3-dioxepane).

The molten starting material can already contain also slight amounts of further additives, such as molecular weight regulators, stabilizers, lubricants, or solvents.

As molecular weight regulators, there can be used all of the materials which are known to act as chain transfer agents in the trioxane polymerization. Preferred molecular weight regulators are linear formals as, for example, dimethyl formal or dibutyl formal and dialkyl ethers of oligooxymethylenes, for example, dioxymethylene dimethyl ether. The molecular weight regulator cannot only be used for establishing the desired molecular weight but also for the production of polyoxymethylenes having functional end groups or oxymethylene-block copolymers. As examples for this purpose, there can be mentioned: diols, e.g., ethylene glycol or propylene glycol, and polyols, e.g., glycerine, carboxylic anhydrides, e.g., phthalic anhydride, formals of haloalcohols, unsaturated alcohols, e.g., allyl alcohol and hydroxy esters.

Furthermore, there can also be added to the molten starting material finely divided solid materials insofar as they do not exceedingly inhibit the polymerization. As examples, there can be mentioned metals, e.g., aluminum, metal oxides, e.g., alumina or ferric oxide, or metal sulfides, e.g., molybdenum disulfide, pigments or inert organic polymers.

The cationically active catalyst inducing the polymerization also preferably is already added to the molten starting material. However, it can also alternatively be fed continuously directly into the reactor simultaneously with the starting materials.

Suitable catalysts are described, for example, in "Kunstoff-Handbuch", Vol. XI, page 12, Carl Hanser Verlag, Munich 1971 and also in the patents and published patent applications mentioned above. Especially suitable are the following noted materials: boron trifluoride, phosphorus pentafluoride, arsenic pentafluoride, and antimony pentafluoride, as well as their complexes, such as boron trifluoride-diethyl etherate and boron trifluoride-di-tert. butyl etherate, triphenylmethyl hexafluorophosphate, trimethyloxoniumhexafluoroarsenate and acetyl hexafluoroantimonate; perchloric acid and perchloric acid compounds, such as t-butylperchlorate and acetyl perchlorate. The catalysts are employed depending on their activity and on the type and purity of the starting material in an amount by weight of 0.1 to 1000 ppm, based on the total weight of the compounds to be polymerized. With boron trifluoride, the customary range of addition is between about 10 and 100 ppm, with perchloric acid between about 0.1 and 10 ppm.

The starting material in liquid form which is to be polymerized is continuously fed into a mixer serving as the reactor in which powdered to granular oxymethylene homopolymer or copolymer is fluidized to a stable fluidized bed with a rotor speed above the critical speed of rotation.

As reactor, there are basically suited all mixers in which the polymerizate particles are mechanically fluidized, quickly mixed with the fluid starting material and prevented from caking through sufficient dispersive forces. These requirements, for example, are fulfilled by specific mixers having rotating mixing implements which are customarily used for mixing solids with liquids or pastes so far as they can be operated with a rotor speed above the critical speed of rotation, such as projecting or intensive mixers (see H. Kraft "Feststoffmischer", Verfahrstechnik 3 (1969) pages 344 to 352).

At the critical speed of rotation $n_K$, the centrifugal force is exactly as large as the force of gravitation:

$$n_k = \frac{1}{2\pi}\sqrt{\frac{g}{R}}$$

$n_K$ is the critical speed of rotation in revolutions per second, g is the acceleration due to gravity, and R is the largest radius of the mixing implement. After exceeding the critical speed of rotation, the particles to be mixed are accelerated in a trajectory. With further increasing rotor speed, then the mixed goods are increasingly broken up and fluidized so that they take on the character of a fluidized bed. Therefore, the rotor speed used in the process in each case is above the critical speed of rotation, preferably above a value of 1.8 times the critical speed of rotation.

Projecting mixers are differentiated according to the type and number of mixing implements, for example, between paddle, impeller, and plowshare mixers, as well as between single and multiple shaft mixers. They are usually operated with horizontally running shafts. Whether predominantly radial or axial mixing occurs depends on the form and arrangement of the mixing elements. A sharp preference to radial mixing favors the "plug flow" or a narrow residence-time spectrum. It is favorable if the mixer has a cylindrical form and if the mixing implements stretch over a highest possible portion of the walls with only small clearance. Through this, the walls can be maintained free from deposits.

The intensive mixers are usually operated with vertically running shafts. Their mixing implements in general rotate only in the lower part of the cylindrical mixing space. The walls are maintained free of deposits in the lower part through the particles of the mixed goods striking with great energy, in the upper part through a slowly rotating scraper.

An "over moisturization" of the fluidized bed is to be avoided since it lowers the mobility of the polymerizate particles due to the adhesive forces, produces formation of clumps, causes baking of polymerizate on the walls and mixer implements, reduces the leading off of the heat of polymerization and finally leads to the collapse of the fluidized bed. Therefore, it is necessary to tune to each other the speed of feeding the polymerizing starting materials and the speed of polymerization as well as the total reactor contents.

Especially the speed of feeding must be so regulated that there are supplied per minute 0.5 to 10, preferably 1 to 5, weight percent, based on the total reactor contents. Furthermore, the catalyst concentration must be so chosen that there occurs a solidification of the liquid starting material within 20 to 50 seconds after addition of the catalyst. Then in general there is reached a polymerization reaction of about 85 to 95 percent within a few minutes. Since except for the type and concentration of catalyst, the speed of polymerization also depends on the temperature, finally the temperature of the reactor contents must be held in the range between 60° and 125° C.

On the one hand, the speed of polymerization increases with increasing catalyst concentration; on the other hand, however, there is reduced the induction time, which is the time from the addition of catalyst up to the beginning of the solidification of the liquid starting material. If the addition of the catalyst already takes place outside the reactor, to avoid a premature polymerization in the supply lines, there scarcely can be realised induction times below 3 to 5 seconds and consequently the catalyst concentration must be correspondingly regulated. The temperature of the liquid starting material fed in can be between 60° and 110° C. However, suitably one stays in the lower range between about 65° to 75° C. because then at the same induction time there can be used a higher catalyst concentration and therethrough there can be produced a quicker polymerization.

Through the control of the temperature of the reactor contents by means of the temperature of the reactor jacket, there is a further possibility of influencing of speed of polymerization. In order to produce the highest space-time-yield, generally an internal temperature above 75° C. is preferred. At internal temperatures of more than 100° C., there is recommended the use of a slight excess pressure in order to prevent the vaporization of volatile monomers. Preferably, the temperature of the reactor contents is held between 75° and 100° C.

The polymerization in the fluidized bed makes possible a very effective withdrawal of the heat of polymerization via the reactor jacket having a liquid heat transfer medium. Depending on the type of construction of the mixer used, it can be advantageous to subdivide the reactor jacket into several zones in order to be able to influence the temperature profile in the direction as wished. Then, for example, it is possible to reduce the temperature of the reactor in the discharge part or to increase the withdrawal of heat in the region where the main amount of the heat of polymerization is liberated.

After a polymerization reaction of at least 70 percent, the polymerizate is discharged from the reactor either continuously or in cycles. Hereby, the state of filling of the reactor is preferably held in the range of about 30 to 70 percent of the reactor volume. If the polymerization is carried out in only one step, naturally there is sought a polymerization reaction of more than 70 percent, especially nearly 100 percent. However, it is also possible to carry out the polymerization in two steps. For example, there can be used an intensive mixer for the first part of the polymerization and a trajectory mixer for the subsequent polymerization. If the polymerization reaction in the first polymerization step has reached at least about 70 to 80 percent, then, however, there can also be employed for the subsequent polymerization shearing mixers (see H. Kraft: "Feststoffmischer", Verfahrenstechnik 3 (1969) pages 344 to 352), which can be operated with a speed rotor lying below the critical speed of rotation.

A cyclical discharge of the polymerizate is recommended in using trajectory mixers having strongly preferential axial mixing and with intensive mixers. In using trajectory mixers having preferential radial mixing, on the contrary a continuous discharge of the polymerizate is generally more advantageous.

In an intensive mixer, the liquid starting material fed in is very quickly distributed over the entire content of the reactor. Therefore, this has overall nearly the same composition. Consequently, the speed of feeding can advantageously be so regulated that it is in the upper part of the above-mentioned range and per minute amounts to 1.5 to 10, preferably 2 to 5, weight percent, based on the total reactor contents.

The ratios are different in the trajectory mixer, if this is passed through in a more or less approximated "plug flow". Here it is more advantageous to select a feeding speed nearer the lower limit of the above-mentioned region and to supply per minute 0.5 to 5, preferably 1 to 3, weight percent of liquid starting material.

A middle position between the intensive mixers and trajectory mixers is occupied by apparatuses which consist of two trajectory mixers that are joined together and feed in opposite direction. The reactor contents are conveyed in a circle in them, the liquid starting material is fed into the first mixer, a part of the polymerizate is discharged at the end of the second mixer, but the rest is returned to the first mixer.

A quick complete mixing of the reactor contents in a trajectory mixer is favored by simultaneously feeding in the liquid starting material at several places and/or already adding it in finely divided form, for example, by means of a spray nozzle. Besides, the turbulence in the fluidized bed can be increased through rapidly running pinned discs or star blades.

Preferably, the trioxane and in a given case at least one compound copolymerizable with trioxane and at least one molecular weight regulator, and the polymerization catalyst are mixed together before feeding into the reactor. A suitable procedure consists of first mixing all the components besides the catalyst in a static mixer and then dosing into this pre-mixture the catalyst in the form of a solution and homogeneously distributing it therein by means of a second static mixer. The residence time in the second static mixer and in the feed pipe to the reactor should be as short as possible. Through suitable dimensioning of the nominal widths or the free passage and the lengths, there can be realized residence times of less than one second without doing anything further.

Further additives, if necessary, according to their suitability, are likewise either already added to the molten starting material or directly fed into the reactor.

The powdery to granular polymerizate present in the reactor is a trioxane homopolymerizate or copolymerizate which has not been subsequently treated chemically and contains as few as possible constituents that negatively influence the polymerization. For starting the apparatus for the first time there can be employed, for example, a polymerizate prepared in the form of polymerized blocks and then comminuted to a particle size of about 1 to 5 mm. Then later suitably there is present a polymerizate formed in an earlier polymerization and stored under nitrogen or at least with the exclusion of moisture.

The polymerizate produced according to the process of the invention first of all can be used for the production of molding compositions. The necessary processing for this comprises the neutralization of the catalyst, the removal of unreacted starting materials, the stabilization of the chain ends, for example, by esterification or etherification or through selective breakdown to stable primary alcohol end groups and finally the working in of chemical stabilizers and in a given case, further additives. Customary methods of working up are described, for example, in "Kunstoff-Handbuch", Vol. XI, pages 13 to 18 and 21 to 23, Carl Hanser Verlag, Munich 1971.

The process can comprise, consist essentially of, or consist of the stated steps with the recited materials.

Unless otherwise indicated, all parts and percentages are by weight.

The invention will be explained in more detail in the following examples.

EXAMPLE 1

Figure 1:
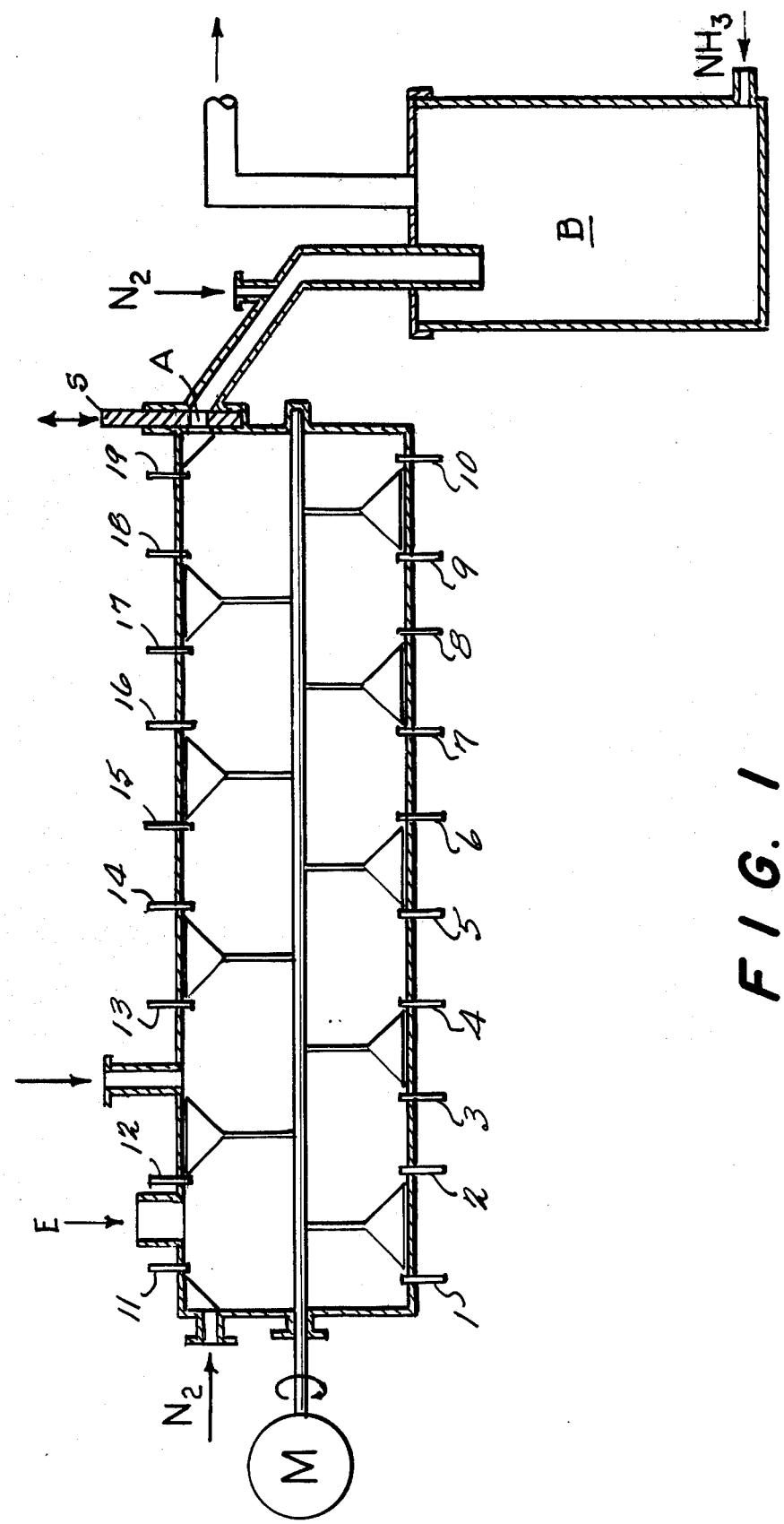
FIG. 1 is a schematic illustration of a reactor useful in the invention.
Figure 2:
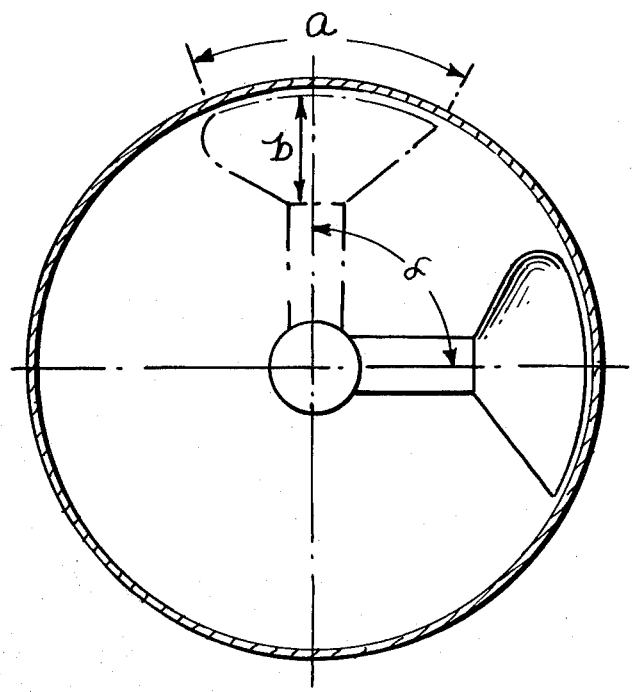
FIG. 2 illustrates form and arrangement of the mixing elements.
Figure 3:
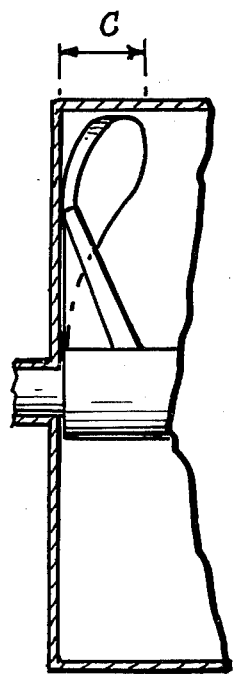
FIG. 3 illustrates form and arrangement of the first and the last of the mixing elements in another projektion.
Figure 4:
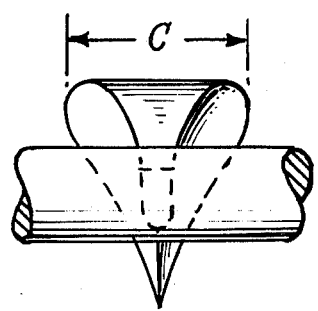
FIG. 4 illustrates form and arrangement of the mixing elements number two until ten in the projektion of FIG. 3.

3874 grams of trioxane, 120 grams of 1,3-dioxolane, and 6 grams of dibutyl formal were polymerized to a block by means of $BF_3$-diethyl etherate. After preliminary comminution, the copolymerizate was ground in a mill having a 3 mm sieve. 2500 grams of the granular copolymerizate were then filled through the feed opening E into the reactor shown in FIG. 1. After closing E, there is led nitrogen through the reactor at partially opened slide valve S. The heating jacket of the reactor is heated by means of a thermostat at 90° C. The reactor has the following dimensions: 125 mm internal diameter and 500 mm long (internally). It has a rotor equipped with 11 mixing elements which are shown schematically in FIG. 1. The form and arrangement of the mixing elements is shown in FIGS. 2, 3, and 4. The first mixing element (see FIGS. 2 and 3) located before the supply has the measurements a=600 mm, b=30 mm, c=25 mm. The last mixing element is arranged as a mirror image to the first, it has the same dimensions. The remaining mixing elements have the form of plowshares (see FIGS. 2 and 4) with the dimensions a=60 mm, b=30 mm, c=50 mm. The distance between the peaks of the blades in the projection in each case is 50 mm. From the following noted angles $\alpha$ (see FIG. 2), there is determined which positions the mixing elements 2 to 11 occupy in this series based on the position of the first element: 53°, 107°, 351°, 230°, 289°, 351°, 51°, 261°, 292°, and 325°. To measure the internal temperature of the reactor, there are installed 10 thermocouple elements below (1 to 10) and 9 above (11 to 19). The thermocouple elements have a diameter of 1.0 mm and project about 0.3 mm into the reactor space. They are insulated against the heating jacket by Teflon (polytetrafluoroethylene) shells having a wall thickness of 3.0 mm. The state of filling in the reactor is controlled by the shift in height of the slide valve S installed at the discharge opening A.

About two hours after switching on the thermostat, the thermocouple elements 1 to 19 indicate about 90° C. A control measurement by means of a thermometer inserted through E into the product showed a temperature of 88.6° C., an indication that the reading of the thermocouple elements 1 to 19, despite the heat insulation, was still influenced by the heating jacket. During the heating up, there was regulated the induction time of the polymerization in the manner described below. There was continuously dosed into a continuous current of a mixture of 96.85% trioxane, 3% 1,3-dioxolane, and 0.15% dibutyl formal having a rate of flow of 4200 g/h and tempered to 70° C. a solution of $BF_3$-diethyl etherate in 1,2-dichloroethane having a $BF_3$ concentration of 5.8 mg/ml, and the solution was homogeneously distributed by flowing through a static mixer. The catalyzed monomer mixture was led through a Teflon tube having a normal width of 1.5 mm into wide mouth glasses having an inner diameter of 26 mm which were put in an aluminum heating block tempered at 90° C. in order to determine the induction time. Then there was measured the time from the beginning of the introduction of the monomer mixture up to the just recognizable formation of turbidity of the sample. The determination was repeated after each change of the catalyst dosage. Through gradually increasing of the catalyst dosage up to 24 ml/h, corresponding to 33 ppm $BF_3$, the induction time was set to about 15 seconds. Immediately before the beginning of the true experiment, 10 ml of catalyst solution is injected into the reactor and distributed in the polymerizate present in order to guarantee a reliable starting of the polymerization. Hereupon, the Teflon tube is connected with the reactor and the rotor drive adjusted to 275 rpm is switched on. The slide valve S is opened to such an extent that per minute there is discharged about 60 grams of product.

The starting of the polymerization is already noticeable after less than one minute by the temperature increase on the thermocouple elements 4 and 5. Within 30 to 60 minutes, there is formed a temperature distribution which remains constant, with the maximum at thermocouple element 5 (93.3° C.), respectively 14 (91.9° C.) and temperature falling off to the entry and discharge. The temperatures in the heating jacket are 90.0° C. at the inlet and 90.6° C. at the outlet.

The granular product being discharged is caught in container B which is emptied about every thirty minutes, and hereby the product is inactivated by gassing with ammonia (1.5 liter/h). The product has an average particle size of about 2 to 3 mm. After seven hours, the supply of the monomer mixture is stopped by disconnecting the tube connection and two minutes later the drive is turned off. Hereupon, there is removed thermocouple element 14, and there is introduced through the opened connection a longer thermocouple element until it goes into the granular polymerizate. The temperature of the product is 95.0° C. In order to determine the yield, the reactor is cooled down and emptied after removing the flange of the cover on the discharge side. The mass of the reactor contents had increased by around 140 grams to 2640 grams. Together with the product withdrawn (27,378 grams) during the experiment there resulted a yield of 27,518 grams (93.6% based on the mixture of monomers employed).

From the product which was discharged between the 3rd and 7th hours of the duration of the experiment, there were taken 5000 grams, and it was mixed in a fluid mixer with 20 grams of isophthalic acid diamide and 25 grams of N,N'-hexamethylene-bis-3-(3',5'-ditert.butyl-4'-hydroxyphenyl)-propionamide. The mixture was then homogenized at 235° C. in a twin screw extruder and simultaneously degassed. There were obtained 4605 grams of stable copolymerizate which had a melt flow index of 190/2.16 of 9.7 grams/10 min. and upon heating for two hours at 220° C. in the air only lost 1.2% of its weight.

EXAMPLE 2

Figure 5:
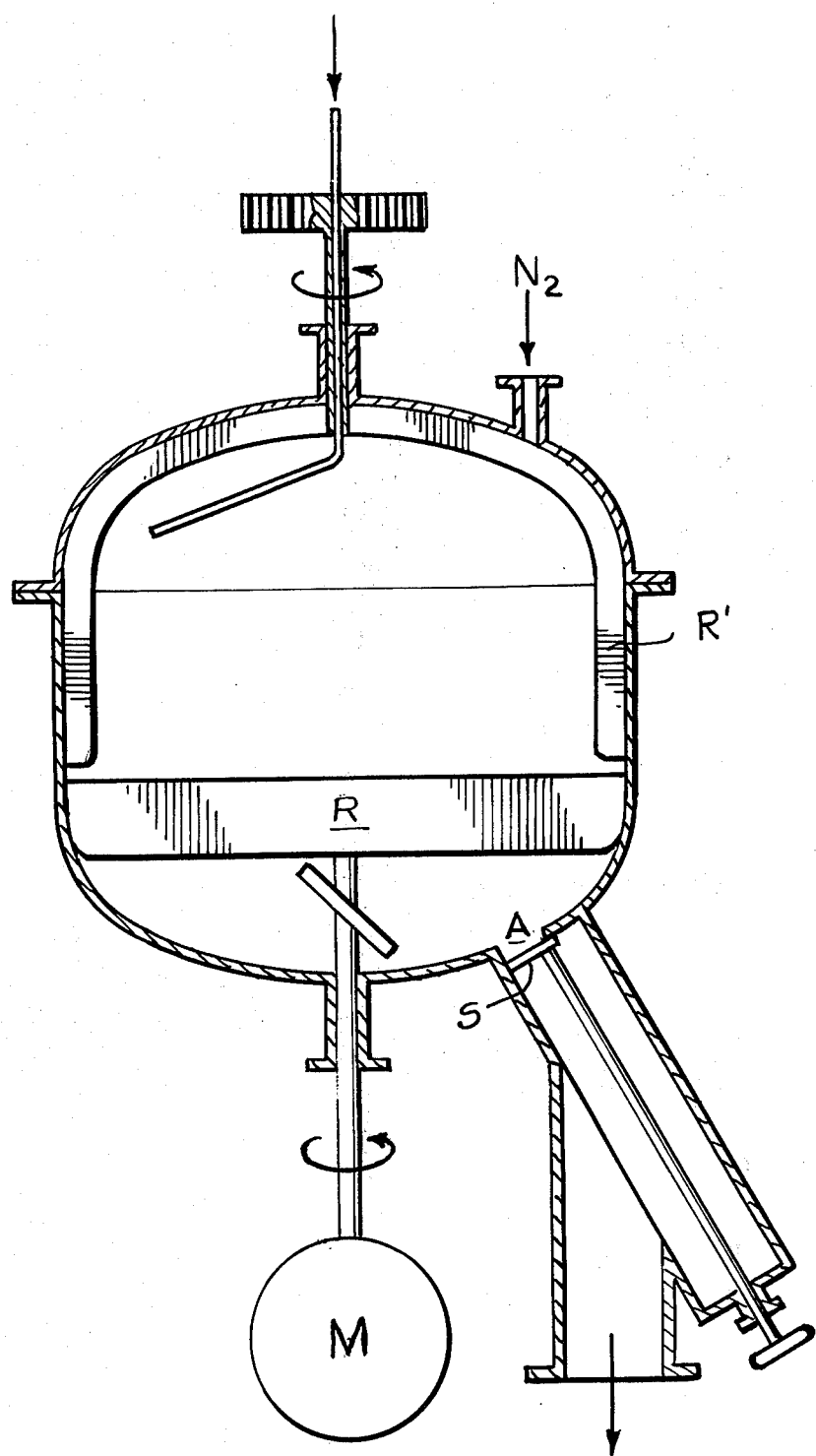
FIG. 5 schematically illustrates another form of reactor.

In a manner analogous to Example 1, there was first produced and comminuted a polymer block made from 3800 grams of trioxane and 200 grams of 1,3-dioxepane by catalysis with t-butyl perchlorate. Then 1500 grams of the ground material was filled into the reactor shown schematically in FIG. 5. After placing on the cover, the reactor was tempered while leading nitrogen through it at 80° C. Hereby, the small tube for the later feeding in of monomer serves as a vent for the stream of nitrogen.

The reactor is a fluid mixer having two stirring blades R adjusted to an angle of 45° arranged over a cross and an anchor-shaped wiper R'. It has an inner diameter of 18 cm and a height of likewise 18 cm (inner). Both the lower part and the cover of the reactor are equipped with a heating jacket. The monomers can be led in through a thin small tube which passes through the hollow shaft of the wiper. The discharge opening A can be closed by means of the sector slide valve S. The stirring blade is driven directly by a drive motor, the wiper indirectly via a cog belt.

After about two hours, the nitrogen supply line is disconnected from the short connecting pipe and a thermocouple element introduced. The temperature of the reactor contents is 78.4° C. The induction time of the mixture of 95% trioxane and 5% 1,3-dioxepane whose polymerization is initiated with t-butyl perchlorate and which mixture is tempered at 80° C. and continuously fed at a rate of 4500 ml/h was determined in the same manner as previously given in Example 1 (whereby, however, the aluminum heating block was tempered at 80° C. instead of 90° C.) and established at 20 seconds. For this, there is necessary a feeding capacity of 11.3 ml/h of catalyst solution which contained 0.2 mg of t.-butyl perchlorate. As solvent for the catalyst, there was employed a mixture of 95% 1,2-dichloroethane and 5% of 1,2-dimethoxy-ethane.

Immediately before the beginning of the true experiment, there were injected 10 ml of catalyst solution into the reactor and the solution distributed in the polymerizate present in oder to guarantee a reliable starting of the polymerization. Hereupon, the monomer line is connected with the reactor and simultaneously there is set in operation the double stirrer as well as the wiper. They revolve at 760 respectively 25 rpm. Every 3 minutes, by a brief turning of the sector sliding valve S, there is discharged about 220 to 230 grams of product. After two hours, the monomer supply was broken off, and one minute later the drive mechanism for the twin stirrer and wiper stopped. The polymerizate (1425 grams) in the reactor had a temperature of 83.6° C.

During the experiment, in all there were discharged 8994 grams of product. Considering the 75 grams too much withdrawn, there was a yield of 8919 grams (99.1%, based on the mixture of monomers employed). The product of the experiment had an average particle size of 4 to 5 mm. To determine the extractable portion, 50 grams were finely ground and heated with 500 ml of methanol for one hour at reflux. The loss on extraction was 8.2%.

The entire disclosure of German priority application P No. 3149321.1 is hereby incorporated by reference.

What is claimed is:

1. A process for the continuous polymerization of trioxane alone or with a copolymerizable monomer in the presence of a cationically active catalyst comprising continuously feeding the starting materials to be polymerized in fluid form into a mixer which serves as the reactor, providing powdered to granular oxymethylene homopolymer or copolymer in the reactor, converting said provided homopolymer or copolymer to a stable fluidized bed by operating said mixer above the critical speed of rotation required to form a fluidized bed, controlling the speed of feeding the materials to be polymerized so that per minute 0.5 to 10 weight percent is supplied based on the total contents of the reactor, selecting the catalyst concentration so that a solidification of the liquid starting material occurs within 20 to 50 seconds after the addition of catalyst, maintaining the temperature of the reactor contents in the range between 60° and 125° C. and discharging polymerizate from the reactor after a polymerization reaction of at least 70%.

2. A process according to claim 1 wherein the polymerizate is discharged continuously.

3. A process according to claim 1 wherein the polymerizate is discharged cyclically.

4. A process according to claim 1 wherein the liquid starting material is fed in at a temperature between 60° and 110° C.

5. A process according to claim 4 wherein the liquid starting material is fed in at a temperature between 65° and 75° C.

6. A process according to claim 1 wherein the liquid starting material is fed in at a temperature between 65° and 75° C.

7. A process according to claim 6 wherein the temperature of the reactor contents is kept between 75° and 100° C.

8. A process according to claim 5 wherein the temperature of the reactor contents is kept between 75° and 100° C.

9. A process according to claim 4 wherein the temperature of the reactor contents is kept between 75° and 100° C.

10. A process according to claim 1 wherein the temperature of the reactor contents is kept between 75° and 100° C.

11. A process according to claim 8 wherein there if formed a copolymer of trioxane and a copolymerizable monomer and the comonomer has the formula

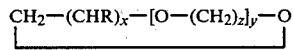

where R is a hydrogen atom, an alkyl group having 1 to 6 carbon atoms, which can be substituted by 1 to 3 halogen atoms, an alkoxymethyl group having 2 to 6 carbon atoms, a phenyl group or a phenoxymethyl group, x is a whole number from 1 to 3 when y is 0; y is a whole number from 1 to 3 when x is zero and z is 2; z is a whole number from 3 to 6 when x is zero and y is 1.

12. A process according to claim 1 wherein there is formed a copolymer of trioxane and a copolymerizable monomer and the comonomer has the formula

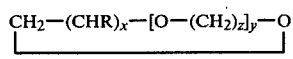

where R is a hydrogen atom, an alkyl group having 1 to 6 carbon atoms which can be substituted by 1 to 3 halogen atoms, an alkoxymethyl group having 2 to 6 carbon atoms, a phenyl group or a phenoxymethyl group, x is a whole number from 1 to 3 when y is 0; y is a whole number from 1 to 3 when x is zero and z is 2; z is a whole number from 3 to 6 when x is zero and y is 1.

* * * * *